United States Patent [19]
Inoue et al.

[11] 3,838,373
[45] Sept. 24, 1974

[54] SELF-RECOVERING CURRENT LIMITER

[75] Inventors: Takeo Inoue; Takashi Shirazawa, both of Kobe; Tadashi Nakazaki, Sanda; Goro Okamoto, Itami, all of Japan

[73] Assignee: Mitsubishi-Denki Kabushiki Kaisha, Tokyo, Japan

[22] Filed: Nov. 30, 1973

[21] Appl. No.: 420,593

Related U.S. Application Data

[63] Continuation of Ser. No. 210,772, Dec. 22, 1971, abandoned.

[30] Foreign Application Priority Data

Dec. 25, 1970  Japan.............................. 45-125607

[52] U.S. Cl.................... 337/21, 337/114, 337/158, 29/623
[51] Int. Cl. .......................................... H01h 85/06
[58] Field of Search ........... 337/114, 116, 118, 119, 337/121, 158, 159, 306, 326; 29/592, 622, 623

[56] References Cited
UNITED STATES PATENTS

| | | | |
|---|---|---|---|
| 3,559,138 | 1/1971 | Itoh et al. | 337/159 X |
| 3,599,137 | 8/1971 | Ito et al. | 337/159 X |
| 3,611,041 | 10/1971 | Itoh et al. | 337/159 X |
| 3,644,860 | 2/1972 | Yamagata | 337/118 X |

*Primary Examiner*—A. T. Grimley
*Attorney, Agent, or Firm*—Oblon, Fisher, Spivak, McClelland & Maier

[57] ABSTRACT

A self-recovering current limiter of the character wherein a circuit breaking condition is provided by vaporizing a current limiting material when a short circuiting or fault current occurs, and being self-restorative to a conductive condition by liquefying the current limiting material after the passage of a specific period of time. Essentially, the self-recovering current limiter comprises a heat resistant and alkali-metal resistant insulator made of beryllia porcelain, alumina porcelain or the like having a channel holding a self-recovering current limiting material which has high impedance in its vapor condition and high conductivity in an orginal liquid condition, an outer tube made of stainless steel or brass surrounding the insulator, and an insulating material packed between the outer tube and the insulator at a temperature higher than that at which it becomes softened.

The insulating material has a coefficient of linear expansion which is higher than that of the insulator below its softening point, and is the same or lower than that of the outer tube. Preferably, the insulating material is made of synthetic mica powder and glassy powder comprising potassium oxide ($K_2O$), sodium oxide ($Na_2O$), lithium oxide ($Li_2O$), barium oxide (BaO) or boric anhydride ($B_2O_3$) as the main component and a small amount of lead oxide (PbO) and silica ($SiO_2$).

11 Claims, 4 Drawing Figures

SELF-RECOVERING CURRENT LIMITER

This is a continuation of application Ser. No. 210,772, filed Dec. 22, 1971, now abandoned.

BACKGROUND OF THE INVENTION

1. Field of the Invention

The present invention relates to a self-recovering current limiter having a closed channel holding a current limiting material which has a high conductivity at low temperatures, and provides a high impedance when vaporized by a short circuiting or fault current. The current limiting material recovers its high conductivity character by returning to a liquefied state after a specific period of time elapses.

2. Description of the Prior Art

The current limiting material used for self-recovering current limiters of the character described conventionally can be a liquid metal, such as Na, K or NaK, which has electric conductivity at room temperature in its liquid condition, but is vaporizable by supplying a large current thereto, because of Joule heat, and is converted to a plasma having high vapor pressure to provide high resistance.

Accordingly, the circuit current is limited to less than a predetermined value. The vaporized metal when cooled is liquefied to self-recover its original electrically conductive condition. In the conventional current limiter, the pressure of the closed channel holding the current limiting material is remarkably increased during operation, such that it is required that the structure defining the closed channel have very high mechanical strength.

Typical examples of self-recovering current limiters holding a current limiting material in a closed channel are disclosed in the U.S. Pat. No. 3,501,730 to Toshio Ito, et al. and the U.S. Pat. No. 3,117,203 to Ralph L. Hurtle, et al. These conventional current limiters have various disadvantages, such as complicated structure, unsuitable insulation and inadequate mechanical strength.

SUMMARY OF THE INVENTION

Accordingly, it is an object of the present invention to provide an improved self-recovering current limiter wherein an insulator having high mechanical strength is provided for holding a self-recovering current limiting material.

It is another object of this invention to provide a compact self-recovering current limiter having a structure of greater strength than conventional current limiters of the character described herein.

The foregoing and other objects are attained according to this invention through the provision of a self-recovering current limiting device having an outer tubular casing surrounding an insulator in which a channel is provided for containing a self-restorative current limiting material, wherein an insulating material is packed at a temperature higher than its softening point between the tubular casing and the insulator, the insulating material having a coefficient of linear expansion which below its softening point is higher than that of the insulator but equal to or lower than that of the tubular casing.

BRIEF DESCRIPTION OF THE DRAWINGS

Various objects, features and attendant advantages of this invention will be more fully appreciated as the same becomes better understood from the following detailed description when considered in connection with the accompanying drawings, wherein like reference characters designate like or corresponding parts throughout the several views, and in which.

DESCRIPTION OF THE ILLUSTRATED EMBODIMENTS

Figure 1:
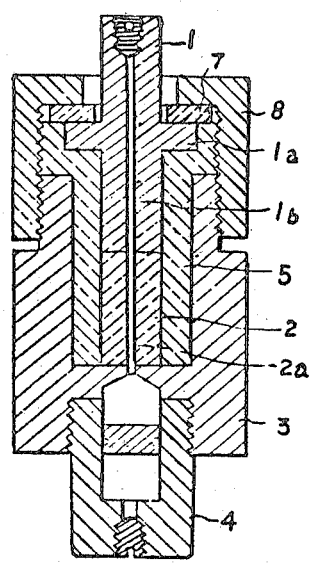
FIG. 1 is a sectional view of one embodiment of a self-recovering current limiter constructed according to this invention.

Referring now to the drawings, and more particularly to FIG. 1, an elongate cylindrical-shaped electrode 1 having a flange 1*a* integrally formed on the outer surface thereof and an axial channel 1*b* extending therethrough is connected through an insulating tube 2 to the top end of a metallic outer tubular type container 3 having another electrode 4 connected to its bottom end. An insulating material 5 is packed between the interior wall of the outer tubular container 3, and the outer walls of the electrode 1 and the insulating tube 2. A penetrating passage is provided between the electrodes 1 and 4 by channel 1*b* in electrode 1 and a coaxial channel 2*a* in insulator tube 2, so that electric conductivity may be maintained by a current limiting material filling the penetrating passage. The flange 1*a* of the electrode 1 is pressed against the packing material 5 through an insulator washer 7 by a cap nut 8 threadably secured to the outer tubular container 3.

When an excessive current is limited by the device, the current limiting material filling the fine channel 2*a* of the insulating tube 2 and the fine channel 1*b* of the electrode 1 is vaporized to provide a high vapor pressure therein, whereby the electrode 1 is urged in an upper direction. The flange 1*a* of the electrode 1 being fixed through the insulator washer 7 with the screw nut 8 serves to prevent accidental dislodging of the electrode 1 under such circumstances.

Figure 2:
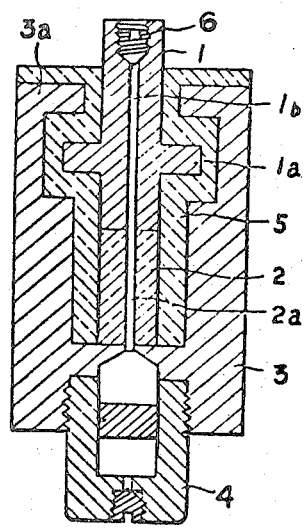
FIG. 2 is a sectional view of another embodiment of a self-recovering current limiter constructed according to this invention.
Figure 3:
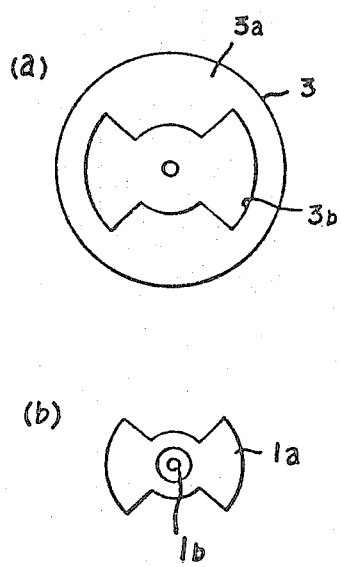
FIGS. 3 (*a*) and 3 (*b*) are respectively plan views of the outer tube and a flange formed on a first electrode of the current limiter shown in FIG. 2.

In the embodiment shown in FIG. 2, the flange 1*a* formed on the outer surface of electrode 1 takes the configuration shown in FIG. 3*b* wherein two arcuate flange portions are disposed in opposite quadrants of a circle about the channel 1*b*. As in the previously described embodiment, the insulator tube 2 has a channel 2*a* axially formed therein, but in this case the outer tube 3 has an inwardly extending flange 3*a* at one end thereof defining an opening 3*b*, as shown in FIG. 3*a*, being substantially similar in design to the flange 1*a* of electrode 1 but somewhat greater in size to accomodate reception of the same therethrough. The electrode 4 is threadably fixed to the bottom of the outer tubular container 2 and an insulating material 5 is packed between the container and the electrode 1 and the insulating tube 2 disposed therein.

The current limiter is prepared by inserting the insulating tube 2 in the open end of the outer tubular container 3, then inserting the electrode 1 into the outer container 3 so as to pass the flange portions 1*a* thereof through the corresponding shaped opening 3b of the flange 3a of the outer container, and then turning the electrode 1 through 90° so as to dispose the flange portions 1a of the electrode 1 in alignment with the flange 3a of the outer container 3, to connect the same against ready separation. The insulating material is then packed into the container and the long channel 1b of the electrode 1 and the channel 2a of the limiting tube 2 are filled with the insulating material through a needle valve 6 in the top of the electrode 1.

The raw materials used for this structure will now be described in detail. The insulating tube 2 preferably is constructed from a heat-resistant and alkali-metal resistant insulative material such as beryllia porcelain, alumina porcelain or the like. The electrodes 1 and 4 should have low electrical resistance and should have coefficients of linear expansion the same as or lower than that of the metal from which the outer tube 3 is constructed, which preferably is copper or copper alloy, such as chromium-copper.

The outer tubular container 3 should have the following characteristics:
a. non-magnetic metal construction;
b. no decrease of rigidity by heat-treatment at 500°C – 600°C;
c. high rigidity at room temperature after such heat treatment at 500°C – 600°C; and
d. high coefficient of linear expansion being the same or higher than those of the copper or copper-alloy, such as chromium-copper, used for the electrodes.

According to these requirements, stainless steel and brass are preferably selected for the container 3. It is especially preferable to use stainless steel because of its high rigidity.

In order to determine the insulating material 5, the mechanical strength required for the case of the current limiting material will be described.

Referring to the structures shown in FIGS. 1 and 2, the current limiter metal filling the long channel 1b of the electrode 1 and the coaxial channel 2a of the insulating tube 2 is vaporized and provides high vapor pressure, such as 3,500–4,000 kg/cm$^2$, when an excess or fault current occurs in the circuit. Accordingly, the pressure given to the channel 2a of the insulating tube 2 as the inner pressure thereof provides tensile stress in the peripheral and axial directions. The beryllia or alumina porcelain of the insulating tube 2 has high pressure strength such as 100 kg/mm$^2$, but low tensile strength such as about 10 kg/mm$^2$. Accordingly, when the tensile stress is provided by such inner pressure, the insulating tube 2 is likely to be broken, so that the current limiting material therein would be leaked to destroy the capabilities of the current limiter. The raw material of which the insulating material 5 is comprised therefore has close relationship to the preparation thereof, which follows.

In the structure shown in FIG. 2, when the electrode 1, the insulating tube 2 and the outer tube 3 are assembled as shown in the drawing, and an organic insulating material 5 is normally packed, no outer pressure is provided on the insulating tube 2. Accordingly, the insulating tube 2 maintains its inherent strength, and has low tensile strength as stated above. Thus, it is impossible for the tube to resist the inner pressure of 3,500–4,000 kg/cm$^2$ provided when a short-circuiting or fault current is limited, whereby the insulating tube 2 would immediately be broken to ruin the current limiter for further use.

In assembling the electrode 1 made of chromium-steel, the insulating tube 2 made of beryllia porcelain and the outer tube 3 made of stainless steel SUS 27 as stated above, and maintaining them at 600°C while packing an insulating material having $18 \times 10^{-6}$ of coefficient of linear expansion, and then cooling them, the following phenomenon results.

The coefficient of linear expansion of beryllia porcelain is $5 \times 10^{-6}$. Accordingly, high pressure force may be kept in the beryllia porcelain insulating tube 2 in the peripheral and axial directions, by contracting the outer tubular container 3 having $18 \times 10^{-6}$ of coefficient of linear expansion and the insulating material 5, whereby the insulating material may be durable to the tensile stress caused by the inner pressure provided by vaporizing the current limiting material.

However, it is virtually impossible to find such an insulating material. It is only possible to consider shrinkage fitting, from the aforementioned view point.

The structure, function and preparation of the insulating material used for this invention will now be considered: A mixture of powder of glassy material and synthetic mica, especially synthetic fluoro-phlogopite mica, is used as the raw basic material of the insulating material 5. The glassy material preferably has the following characteristics:
a. High coefficient of linear expansion;
b. Viscosity being remarkably decreased by raising from a transition temperature in the range of 450°C – 500°C;
c. Transparency kept at lower than 600°C – 650°C;
d. High insulating resistance; and
e. No corrosion to synthetic fluoro-phlogopite mica found at 600°C – 650°C.

It is preferable to use a composition comprising $K_2O$, $Na_2O$, $Li_2O$, $BaO$ or $B_2O_3$ as the main component and a small amount of $PbO$ and $SiO_2$.

The synthetic gold-fluoride mica is preferably flat-shaped having large particle size, for preventing reaction with the glassy material and providing high fluidity in pressure moulding. It is most preferable to use a mica having 60–100 mesh particle size. The amount of the glassy material in relation to the total of the glassy material and the mica is preferably about 30 – 70% by volume.

Where the glassy material is rich, the viscosity of the mixture powder is decreased to provide high fluidity during heat pressure moulding and the insulating material is easily packed. However, in this case, the solidifying point is decreased, the remaining compressive, force is decreased and the elastic modulus is also decreased to provide weak strength.

On the contrary, where the glassy material is poor, the packing conditions are inferior. However, where complete packing can be attained, high compressive force is retained to provide high strength. The coefficient of linear expansion of the moulded product obtained by heat pressure moulding is dependent upon the raw material. The moulded product is usually dependent upon the characteristics of the glassy material and is remarkably expanded at about the softening point of the glassy material. However, the coefficient of linear expansion of the moulded product in the lower temperature range is important for this invention and is the same or lower than that of the metal from which the outer tube 3 is constructed, but is higher than that of the porcelain from which the insulating tube 2 is made.

One embodiment of a process for packing the insulating material is illustrated in the following example.

Example

50% of volume of glassy powder consisting of $K_2O$, $Li_2O$, $Na_2O$, $BaO$, $PbO$, $B_2O_3$ and $SiO_2$ having a transition temperature of 420°C. and a particle size less than 250 mesh and 50% by volume of synthetic fluorophlogopite mica having particle size of 60–100 mesh were mixed, and then about 7% of volume of water was added and mixed.

Figure 4:
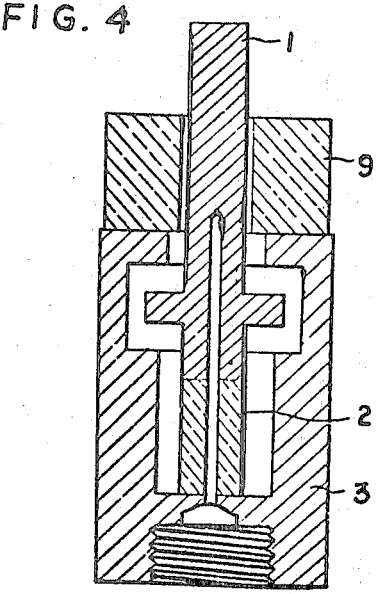
FIG. 4 is a plan view of a press moulding body for preparing the current limiter shown in FIG. 2.

The moulded product 9, shown in FIG. 4, was prepared by moulding the resulting mixture under a pressure of 500 kg/cm² and using a metal mould at room temperature. As shown in FIG. 4, the outer tubular container 3 made of stainless steel SUS 27, the insulating material 2 made of beryllia porcelain, the electrode 1 made of chromium-copper alloy, and the moulded product 9 obtained from the mixture of glassy material and mica were assembled and kept for 30 minutes in an electric furnace at 600°C. The assembly was transferred in a mould and was pressed under a pressure of 2 ton/cm² so as to pack the insulating material of glassy material and mica into the space between the outer tubular container 3 and the insulating tube 2 and the electrode 1 disposed therein. When the moulded product cooled to 350°C, the compression was stopped and the moulded product was then cooled to room temperature. The moulded product packed as the insulating material by this process is quite useful as the current limiter, because it is durable to tensile stress caused by inner pressure provided by vaporizing the current limiting material. The glassy material mica composition of the insulating material 5 of the Example, has a coefficient of linear expansion of $11.5 \times 10^{-6}$ in the room temperature range to its softening point, and a solidifying point of 450°C.

The coefficient of linear expansion or contraction of the insulating material 5 is remarkably high when the insulating material is compressed at 600°C and is cooled to 450°C. However, the insulating material has fluidity and is compressed, so that no gap is caused in the packed part for contraction. When the insulating material is cooled to the solidifying point, or about 450°C, in the 100% packed condition, the coefficient of linear expansion is completely decreased to $11.5 \times 10^{-6}$ of coefficient of linear expansion and the fluidity is completely stopped.

Accordingly, the insulating material 5 is not compressed by the contraction of the outer tubular container 3 while the moulding pressure is applied on the insulating tube 2, but the compressive stress is not applied to the insulating tube by the contraction of the insulating material, at temperatures higher than 450°C. However, when it is cooled to lower than 450°C, the insulating material is compressed by the high contraction of the outer tube 3, whereby both the contraction compressive stress of the outer tube 5 and the contraction compressive stress of the glassy material mica composition are applied to the insulating tube 2 of beryllia porcelain having the smallest coefficient of linear expansion i.e., $5 \times 10^{-6}$.

Thus, high compressive stress is retained in an insulating tube 2 of beryllia porcelain. The compressive stress is applied in the peripheral direction as well as the axial direction, whereby the strength thereof is remarkably increased in comparison with the beryllia porcelain itself. In this condition, it is similar to provide the press-moulding condition given by a rubber-press after releasing the compression.

The self-recovering current limiter prepared by this process has the compressive stress remaining on the insulating tube 2, so that the insulating tube 2 has high mechanical strength being durable to the high pressure of the current limiting operational period, and moreover, the insulating material 5 is not changed or softened below 450°C, and has high heat resistance.

The mica powder has a flat plate-shape and is held in a laminated condition. Accordingly the glassy material mica composition has higher elastic strength than that of single glassy material, and is advantageously not broken by repeated rapid heating and cooling.

Obviously many modifications and variations of the present invention are possible in light of the above teachings. It is to be understood, therefore, that within the scope of the appended claims, the invention may be practiced otherwise than as specifically described herein. Accordingly,

What is claimed as new and desired to be secured by Letters Patent of the United States is:

1. A self-recovering current limiter comprising:
   a first electrode having a through channel;
   an insulator member having a through channel connected to said through channel of said first electrode;
   an outer tubular container surrounding said insulator member;
   an insulating material packed between said outer tubular container and said insulator member at a temperature higher than the softening point thereof, and said insulating material having a coefficient of linear expansion being higher than that of said insulator member below said softening point and the same or lower than that of said outer tubular container;
   a second electrode disposed within one end of said outer tubular container; and
   a self-recovering current limiting material within said through channels of said first electrode and said insulator member having high impedence in a vapor condition so as to insulate said electrodes and high conductivity in a normal unvaporized state so as to electrically connect said electrodes.

2. A self-recovering current limiter as set forth in claim 1, wherein said insulating material is a composition comprising:
   a mica powder; and
   a glassy material made from the group consisting of potassium oxide, sodium oxide, lithium oxide, barium oxide and boric anhydride as a main component and small amounts of lead oxide and silica.

3. A self-recovering current limiter as set forth in claim 2, wherein the amount of said glassy material relative to the total of said glassy material and said mica powder is in the range of 30 – 70% by volume.

4. A self-recovering current limiter as set forth in claim 2, wherein said mica powder has a particle size of 60 – 100 mesh and said glassy material has a particle size being less than 250 mesh.

5. A self-recovering current limiter as set forth in claim 2, wherein said insulator member is made of beryllia porcelain.

6. A self-recovering current limiter as set forth in claim 2, wherein said insulator member is made of alumina porcelain.

7. A self-recovering current limiter of claim 2, wherein said outer tube is made of stainless steel.

8. A self-recovering current limiter of claim 2, wherein said outer tube is made of brass.

9. A self-recovering current limiter as set forth in claim 1, wherein:
said insulating material is a composition comprising a mica powder and a glassy material made of a selected one of the group consisting of potassium oxide, sodium oxide, lithium oxide, barium oxide and boric anhydride as a main component and small amounts of lead oxide and silica;
said insulator member is made of a selected one of the group consisting of beryllia porcelain and alumina porcelain; and
said outer tubular container is made of a selected one of the group consisting of stainless steel and brass.

10. A self-recovering current limiter which comprises:
an insulator member having a through channel;
a first electrode;
a second electrode having a through channel connected to said through channel of said insulator member and a flange on the outer periphery thereof;
a metallic outer tube surrounding said insulator member having a flange on the interior surface thereof with an opening passing between portions of said flange for permitting and preventing the passing of said flange on said second electrode into and from the end of said tube;
a self-recovering current limiting material in said through channels of said second electrode and said insulator member which has high impedance in a vapor state to cause electrical insulation of said electrodes, and high electric conductivity in an original unvaporized state to electrically connect said electrodes; and
an insulating material packed between said outer tubular container and said insulator member and said second electrode disposed therein at higher than the softening point temperature thereof, said insulating material having a coefficient of linear expansion being higher than that of said insulator member at temperatures below said softening point and the same or lower than that of said outer tubular container.

11. In a self-recovering current limiter comprising a first electrode having a through channel, and insulator member having a through channel connected to said through channel of said first electrode, an outer tubular container surrounding said insulator member so as to leave a gap therebetween, a second electrode disposed within one end of said outer tubular container, and a self-recovering current limiting material adapted to be disposed within said through channels of said first electrode and said insulator member having high impedence in a vapor condition so as to insulate said electrodes and high conductivity in the normal unvaporized state so as to electrically connect said electrodes, the method of increasing the mechanical strength of said insulator member an effective amount so as to withstand the vapor pressure created by said current limiting material when in said vaporized state, comprising the steps of:
providing a molded insulating material comprised of mica and a glassy powder;
heating said molded insulating material, said first electrode, said insulator member and said outer tubular container at a temperature higher than the softening point of said molded insulating member;

compressing said softened insulating member so as to fill said gap between said outer tubular container and said insulator member; and
cooling said insulating material, said first electrode, said insulator member and said outer tubular container to a temperature just below the softening point of said insulating material at which point said compressing step ceases and the product produced thereby is further cooled to room temperature.

* * * * *